United States Patent
Bag

(10) Patent No.: US 9,501,257 B1
(45) Date of Patent: Nov. 22, 2016

(54) PASS-THROUGH PRINTING WITH XPS PRINTER DRIVER

(71) Applicant: Lexmark International, Inc., Lexington, KY (US)

(72) Inventor: Dipak Kumar Bag, Kolkata (IN)

(73) Assignee: LEXMARK INTERNATIONAL, INC., Lexington, KY (US)

(*) Notice: Subject to any disclaimer, the term of this patent is extended or adjusted under 35 U.S.C. 154(b) by 0 days.

(21) Appl. No.: 14/745,538

(22) Filed: Jun. 22, 2015

(51) Int. Cl.
*G06F 15/00* (2006.01)
*G06F 3/12* (2006.01)

(52) U.S. Cl.
CPC ........ *G06F 3/1298* (2013.01); *G06F 3/1205* (2013.01); *G06F 3/1248* (2013.01); *G06F 3/1254* (2013.01); *G06F 3/1277* (2013.01)

(58) Field of Classification Search
USPC ...................................... 358/1.15
See application file for complete search history.

(56) References Cited

U.S. PATENT DOCUMENTS

| | | | |
|---|---|---|---|
| 2005/0267797 A1 | 12/2005 | Takahashi | |
| 2007/0011212 A1* | 1/2007 | Koppich | G06F 17/30011 |
| 2009/0237721 A1* | 9/2009 | Jeong | G06F 3/1208 |
| | | | 358/1.15 |
| 2012/0257252 A1 | 10/2012 | Shah | |
| 2012/0300248 A1* | 11/2012 | Robertson | G06F 3/1204 |
| | | | 358/1.15 |
| 2013/0010316 A1* | 1/2013 | Tokuda | G06F 3/1285 |
| | | | 358/1.13 |
| 2013/0258375 A1* | 10/2013 | Morgana | G06K 15/1857 |
| | | | 358/1.13 |

OTHER PUBLICATIONS

Wikipedia; wikipedia.org; Job Control Language; encyclopedia; Apr. 23, 2015; pp. 1-17.
Wikipedia; wikipedia.org; Open XML Paper Specification; encyclopedia; Apr. 23, 2015; pp. 1-8.
Microsoft; microsoft.com; XPS Printer Driver (XPSDrv); Microsoft on-line product library; Apr. 23, 2015; p. 1.
Microsoft; microsoft.com; XPSDrv Render Module; Microsoft on-line product library; Apr. 23, 2015; pp. 1-2.
Microsoft; microsoft.com; XPSDrv Configuration Module; Microsoft on-line product library; Apr. 23, 2015; pp. 1.
Microsoft; microsoft.com; XPSDrv Installation; Microsoft on-line product library; Apr. 23, 2015; pp. 1.
Microsoft; microsoft.com; XML Paper Specification: Overview; Microsoft on-line product library; Apr. 23, 2015; pp. 1-2.
Microsoft; microsoft.com; Passthrough Printer Escape Function; Microsoft on-line product library; Apr. 23, 2015; pp. 1-2.
Microsoft; microsoft.com; V4 Printer Driver Rendering Architecture; Microsoft on-line product library; Apr. 23, 2015; pp. 1-2.
Microsoft; microsoft.com; XPSDrv Printer Drivers; Microsoft on-line product library; May 29, 2015; pp. 1.
Ricoh; Ricoh Process Director for AIX<Using Ricoh Process Director for AIX>Configuring the system>Defining printer devices; ricoh-usa.com/help/index ; May 29, 2015; pp. 1-2.

* cited by examiner

*Primary Examiner* — Saeid Ebrahimi Dehkord

(57) ABSTRACT

Methods and apparatus include pass-through printing for print jobs sent to an imaging device from a computing device having an XPS printer driver. If an input and output type of the print job corresponds to XPS, the print job passes directly to the imaging device. If the input type is XPS but the output type is not XPS, an XPS-to-PS filter converts the print job to PS. For PS print jobs, a decider filter reads whether or not a PDF pass-through flag is set in a JCL header to determine whether or not a user of the print job seeks to prevent loss of color fidelity. Upon determining whether an originating document corresponding to the print job is a PDF document, the print job is bundled for imaging with its content and header and converted from PS to PDF or PDF to PS as necessary.

7 Claims, 3 Drawing Sheets

PASS-THROUGH PRINTING WITH XPS PRINTER DRIVER

FIELD OF THE EMBODIMENTS

The present disclosure relates to printing. It relates further to printing with an XPS printer driver with pass-through capabilities to maintain high color fidelity.

BACKGROUND

With the advent of Microsoft's Windows 10 operating system, no longer will its XPS (XML Paper Specification) printer driver (version 4 (v4) XPSDrv) support PS (PostScript) pass-through printing. While earlier PS printer drivers supported this feature, e.g., v3 GDI PS, no longer will users of the new operating system be able to maintain high color fidelity when printing PDF content.

Accordingly, the inventor has identified a need in the art to support PDF pass-through printing with modern XPS printer drivers, especially v4 XPSDrv. The need extends to supporting printing of multiple streams of data, e.g., PDF (Portable Document Format), XPS and PS, with but a single XPS printer driver. Additional benefits and alternatives are also sought when devising solutions.

SUMMARY

The foregoing and other problems are solved by methods and apparatus for pass-through printing from a computing device with an XPS printer driver to an imaging device. In one embodiment, a user-selectable option is provided with a version 4 (v4) XPSDrv Printer Driver to allow content of a PDF document to pass-through as-is from the computing device to the imaging device. The printer driver implements a decider filter in an otherwise traditional v4 filter pipeline to retrieve content of the document from a physical location of a stored file and decide the output data that will be sent to the imaging device. The method accommodates three different streams of data (PDF, PS and XPS) and packages it for the imaging device from a single XPS driver, per the user selection. The method includes retrieving and parsing XPS and PS raw data to discern the data type of the print job and retrieving the JCL (Job Control Language) header generated by a core driver. It processes output data and wraps the data with proper JCL commands for appropriate finishing options.

In a representative embodiment, if an input and output type of the print job corresponds to XPS, the print job passes directly to the imaging device. If the input type is XPS but the output type is not XPS, an XPS-to-PS filter converts the print job to PS. For PS print jobs, a decider filter reads whether or not a PDF pass-through flag is set in a JCL header of the print job to determine whether or not a user of the print job seeks to prevent loss of color fidelity in the print job. Upon determining whether or not an originating document corresponding to the print job is a PDF document, the print job is bundled for imaging with the data and header and converted from PS to PDF or from PDF to PS as necessary. A particular implementation augments Microsoft's version 4 (v4) XPSDrv printer driver with the decider filter and arranges it together with the filter pipeline manager and XPS-to-PS filter by way of an inter-filter communicator.

These and other embodiments are set forth in the description below. Their advantages and features will become readily apparent to skilled artisans. The claims set forth particular limitations.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, methods and apparatus teach pass-through printing with an XPS printer driver to maintain high color fidelity in a printed document corresponding to an originating document selected for printing by a user.

Figure 1:
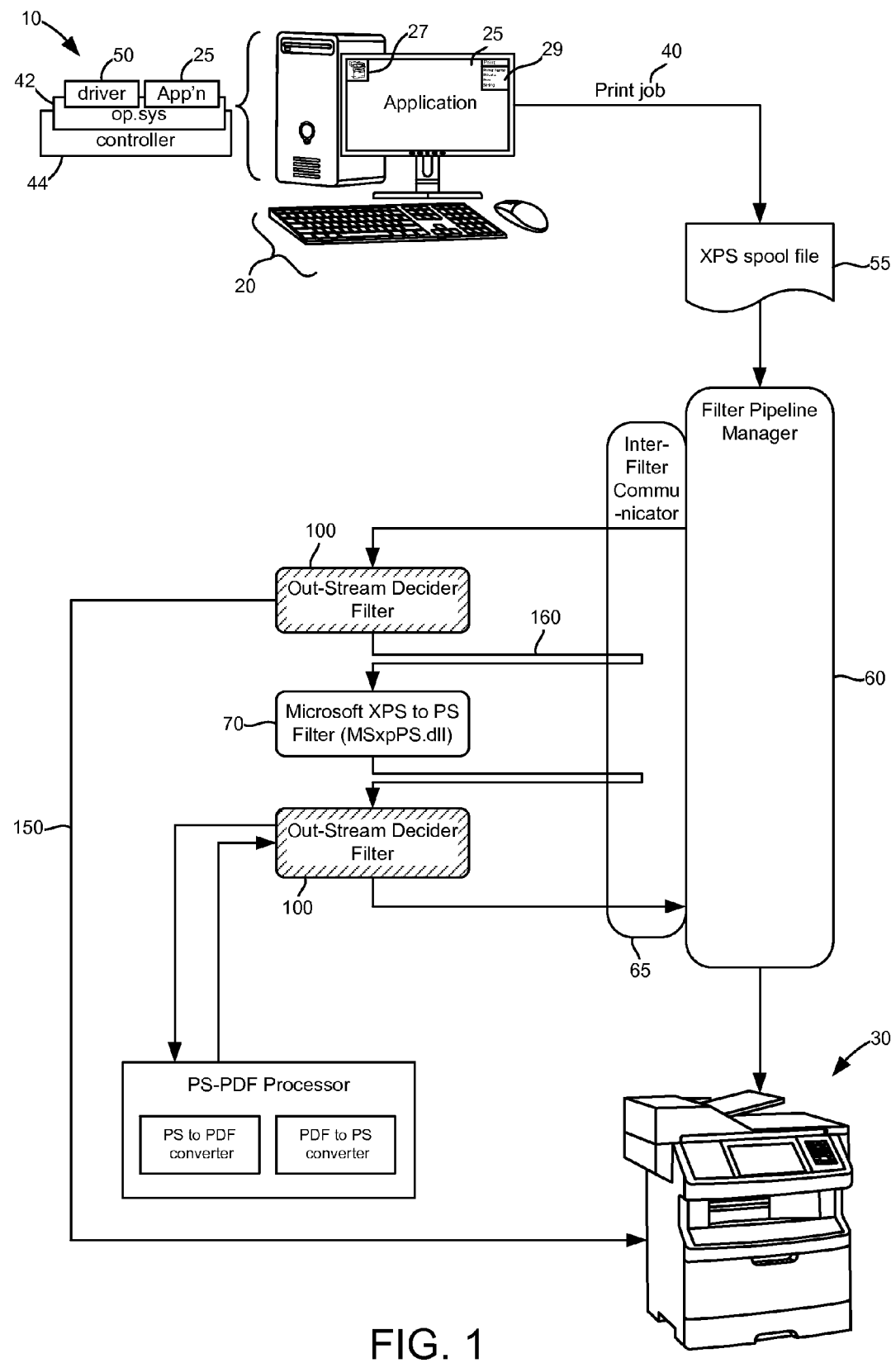
FIG. 1 is an overview of pass-through printing with an XPS printer driver.

With reference to FIG. 1, a computing environment 10 includes computing devices 20 such as desktops, laptops, tablets, smart phones, etc. and imaging devices 30 such as printers, copiers, fax machines, etc. Users interact with their devices 20 by way of a display screen, pointing device, screen gesture, etc. They engage applications 25 to create items for printing, such as documents, images, etc. Users request printing by selecting a printer icon 27, for example, or "clicking" print on a drop down menu 29, as is familiar. Either action initiates a "print job" 40 direct from a network port of the computing device to the imaging device or indirect by way of a print server (not shown) and attendant computing network. An operating system 42 of the computing device hosts the application, in turn, a controller such as an ASIC or microprocessor hosts the operating system. The operating system also hosts a printer driver 50.

During use, the printer driver formats print jobs in a manner for controllers in the devices to speak to one another in a common language and without regard to the technical details of the devices which vary from model to model and manufacturer to manufacturer. Print jobs usually consist of two language components: the page description language (PDL) defining the content of the print job, e.g., 'what' is to be printed; and the job control language (JCL) describing finishing parameters of 'how' the content is to be printed. Details of the JCL are typically set by a user and typify paper size, paper type, numbers of copies, stapling, binding, folding, etc. The print job typically bundles first the JCL instructions followed by the PDL instructions. Common JCL's include Hewlett Packard's printer job language (PJL), Xerox's printer instruction format (XPIFF) and Microsoft's "print tickets." Common PDL's include PostScript (PS), printer command language (PCL), portable document format (PDF), XML paper specification (XPS), etc. With the arrival of Microsoft's Windows 10 operating system, however, the v4 XPSDrv printer driver will not support color fidelity of Adobe-like PDF applications.

Thus, a decider filter 100 accompanies a traditional XPS printer driver to preserve color fidelity in various applications 25 by allowing content of PDF documents to pass-through as-is to an imaging device. The filter also processes output data for imaging by wrapping it with proper JCL commands for appropriate finishing options. The decider filer 100 is arranged with both a traditional filter pipeline manager 60 and an XPS-to-PS filter 70 and communicates by way of an inter-filter communicator 65 that passes data to and fro.

Figure 2A:
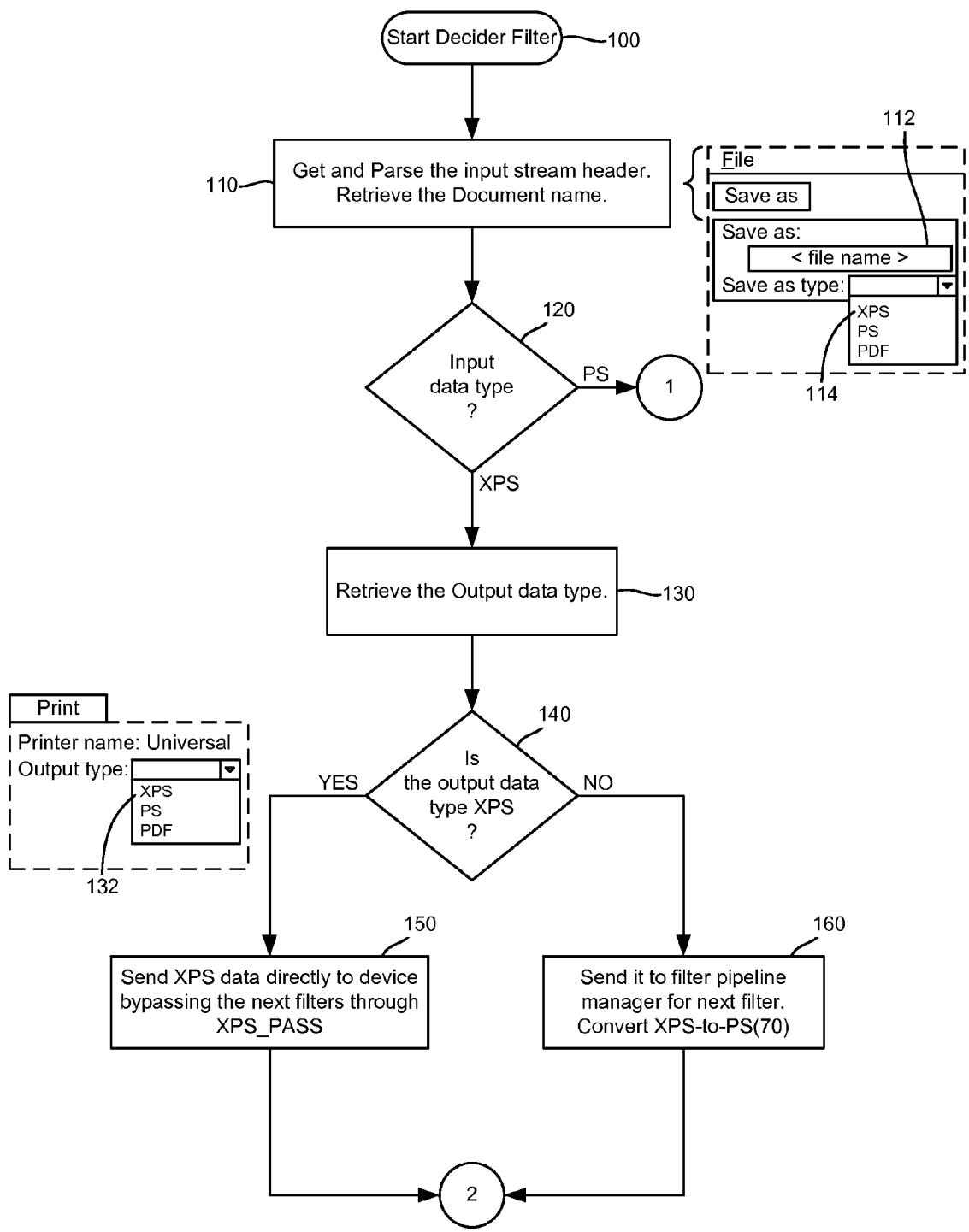
FIGS. 2A and 2B are flow charts for various instances of calling a decider-filter in the architecture of the printer driver.

A print job 40 is processed out of an XPS spool file 55 by the pipeline manager 60 where it is sent to a first call of the decider filter 100. With reference to FIG. 2A, the decider filter retrieves and parses the input stream header of the print job (110). It also retrieves the underlying name of the document provided by the user when saving the document of the application in a dialog box (112), for example. The filter next examines and determines the input type of the print job (120) from the input stream header. If the first four bytes of the header match with {'P', 'K', 0x03, 0x04}, then the input type can be said to be XPS data. Otherwise, if the first nine bytes match with {0x1B, 0x25, 0x2D, 0x31, 0x32, 0x33, 0x34, 0x35, 0x58} then the input type is PS data, including a valid JCL header. Of course, the input type always corresponds to XPS data upon the first calling of the decider filter 100 as only XPS data will be stored in the XPS spool file.

Next, the decider filter retrieves the output type of the print job (130), such as may be set by users in a drop-down menu according to their selected output desires (132). If the output type is in fact XPS (140), then the print job passes directly to the imaging device (150), thus bypassing further filters in the pipeline of filters. On the other hand, if the output type is not XPS (140), the print job is advanced (160) to the next filter, the XPS-to-PS filter 70. This converts the print job to PS.

Figure 2B:
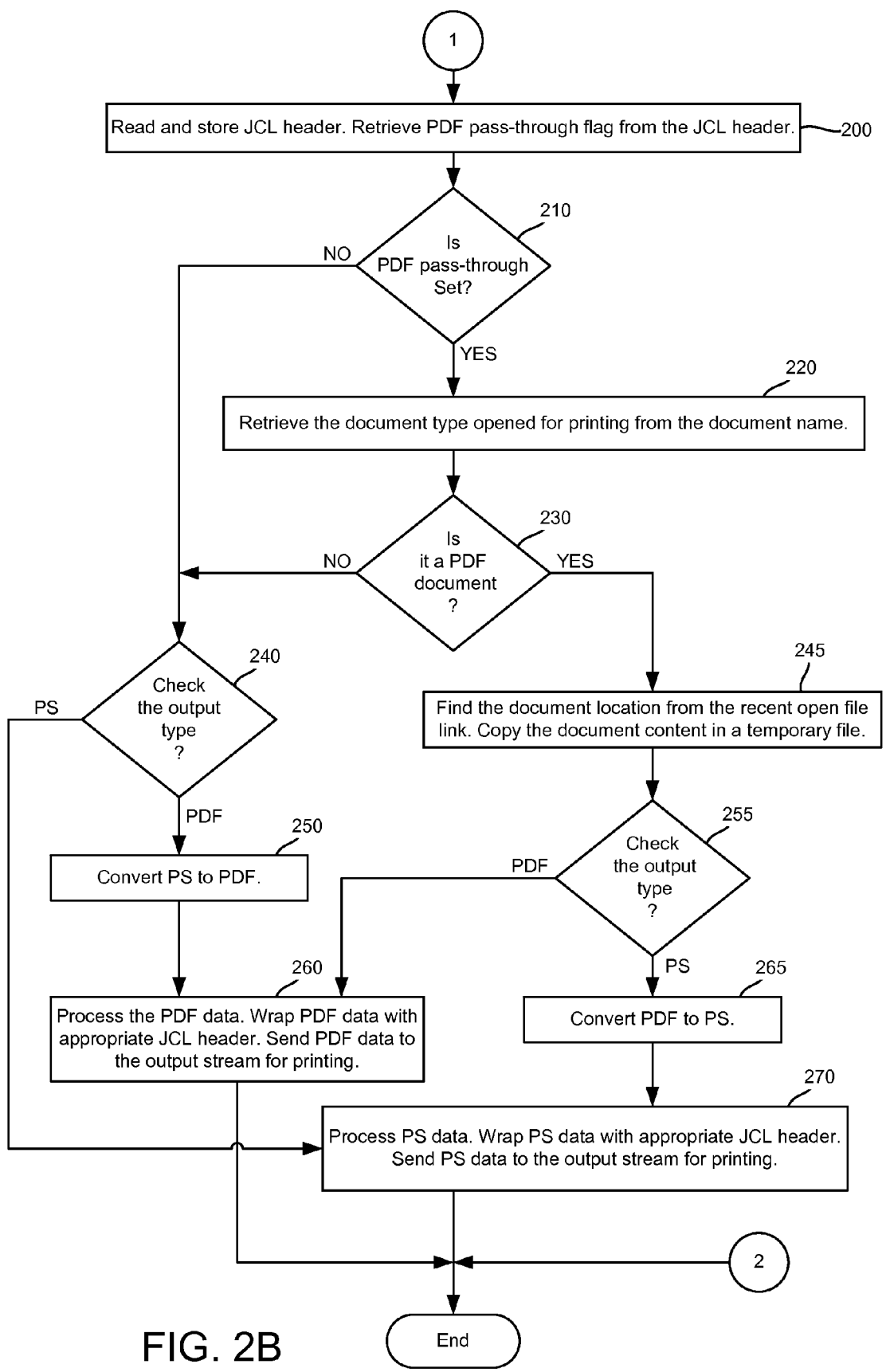

With reference back to FIG. 1, after the conversion of the print job at filter 70, the print job again passes back to the decider filter 100 by way of the inter-filter communicator 65. This again starts the workflow of FIG. 2A. That the print job is now PS, not XPS, the outcome of the decision at (120) differs from earlier. The print job now matches the first nine bytes of the input stream header with {0x1B, 0x25, 0x2D, 0x31, 0x32, 0x33, 0x34, 0x35, 0x58} and includes a valid JCL header. With reference to FIG. 2B, the JCL header is read by the decider filter and stored (200). The pass-through flag of the header is also obtained. If the user set the pass-through flag (210), then the user seeks to maintain high color fidelity when printing. The filter next determines the document type by checking the document name (220), such as decided by the user (112/114, FIG. 2A). If the document is a PDF document (230), it will have a .pdf file extension with its <file name>, for example. If so, the location of the document to be imaged is obtained, such as from the recent open file link, and copied into a temporary file to ease execution of processing the print job (245).

At either (255) for a .pdf document or (240) for a non-pdf document, the output type of the print job is checked by the filter. This is done by checking the JCL portion of the print job to see which of the following strings exist. If the JCL header contains "@PJL ENTER LANGUAGE= POSTSCRIPT," then the content of the print job is PS data. Otherwise, if "@PJL ENTER LANGUAGE=PDF" is present in the JCL header, then the content of the print job is PDF data.

Depending upon whether or not the user seeks a .pdf document (230) printed as PS or PDF output type (240/255), the appropriate conversions take place of the data of the print jobs from PS to PDF (250) or PDF to PS (265). Those print jobs that ultimately require PDF printing, the content of the PDL is processed as a PDF and wrapped with an appropriate JCL header based on user inputs (260). Alternatively, those print jobs that require PS printing, the content of the PDL is processed as PS and wrapped with an appropriate JCL header (270). The print jobs are then advanced to the imaging devices 30 for final printing, as is typical.

Relative advantages should be now apparent to those skilled in the art. They include, but are not limited to, achieving performance gains during printing because 1) all filters are stream based, and 2) PDF output types generate smaller output data for transmitting to an imaging device, thus improving operation. Three different streams of data (PDF, PS and XPS) are also packaged for imaging from a single XPS driver, per a user selection.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. A method of maintaining color fidelity in print jobs sent to an imaging device from a computing device having a version 4 (v4) XPSDrv printer driver with a filter pipeline manager and an XPS-to-PS filter, wherein the improvement comprises:
    augmenting the v4 XPSDrv printer driver with a decider filter; and
    arranging the decider filter with an inter-filter communicator of the filter pipeline manager; the decider filter configured for
        discerning an input type of the print job; and
            if the input type is XPS and an output type of the print job is XPS, passing directly the print job to the imaging device, otherwise
            if the input type is XPS and an output type of the print job is not XPS, passing the print job to the XPS-to-PS filter by way of the inter-filter communicator and converting the print job to PS.

2. The method of claim 1, discerning again the input type of the print job upon a second instance of calling the decider filter.

3. The method of claim 2, reading a JCL header of the print job and determining whether or not a PDF pass-through flag is set to prevent loss of color fidelity in the print job.

4. The method of claim 2, if the PDF pass-through flag is set in the JCL header, further including determining whether or not an originating document of the print job corresponds to a PDF document.

5. The method of claim 3, further including determining whether the output type of the print job corresponds to PS or PDF.

6. The method of claim 3, further including converting the print job from PS to PDF or from PDF to PS depending upon the output type of the print job.

7. The method of claim 3, further including retrieving a name of a document corresponding to the print job.

* * * * *